United States Patent
Finch, II et al.

(10) Patent No.: US 6,750,885 B1
(45) Date of Patent: Jun. 15, 2004

(54) TIME KEEPING AND EXPENSE TRACKING SERVER THAT INTERFACES WITH A USER BASED UPON A USER'S ATOMIC ABILITIES

(75) Inventors: Curtis L. Finch, II, Austin, TX (US); William R. Leake, Austin, TX (US); William Miller, Austin, TX (US); Chris V. Anderson, Austin, TX (US)

(73) Assignee: Journyx, Inc., Austin, TX (US)

( * ) Notice: Subject to any disclaimer, the term of this patent is extended or adjusted under 35 U.S.C. 154(b) by 569 days.

(21) Appl. No.: 09/606,741

(22) Filed: Jun. 29, 2000

Related U.S. Application Data

(60) Provisional application No. 60/179,218, filed on Jan. 31, 2000.

(51) Int. Cl.$^7$ ................................................. G09G 5/00
(52) U.S. Cl. ..................... 345/777; 345/776; 713/201
(58) Field of Search ............................. 707/3, 102, 104; 710/100; 395/201; 345/700, 776, 777; 713/200, 201; 705/32, 11; 709/203, 224, 230

(56) References Cited

U.S. PATENT DOCUMENTS

| | | | | |
|---|---|---|---|---|
| 5,899,981 A | * | 5/1999 | Taylor et al. | 705/30 |
| 5,991,742 A | * | 11/1999 | Tran | 705/32 |
| 6,073,108 A | * | 6/2000 | Peterson | 705/8 |
| 6,088,340 A | * | 7/2000 | Buchholz et al. | 370/310 |
| 6,141,649 A | * | 10/2000 | Bull | 705/11 |
| 6,202,060 B1 | * | 3/2001 | Tran | 707/3 |
| 6,330,586 B1 | * | 12/2001 | Yates et al. | 709/201 |
| 6,338,097 B1 | * | 1/2002 | Krenzke et al. | 709/329 |
| 6,343,311 B1 | * | 1/2002 | Nishida et al. | 709/203 |
| 6,347,306 B1 | * | 2/2002 | Swart | 705/32 |

OTHER PUBLICATIONS

Replicon, Inc., "Web Timesheet", 1998, five pages.*
Andy Feibus, "Automated time–trackers", Informationweek; Manhasset, Jul. 5, 1999, four pages.*
Clockware, Tock® is the easy–to–use web–based time tracking system for enterprises and workgroups, Nov. 11, 1998, seven pages.*
Internet Archive Wayback Machine—www.archive.org, Search Results for Jan. 1, 1996—Jun. 29, 2003, "www-.journyx.com", one page.*

* cited by examiner

*Primary Examiner*—F. J. Bartuska
*Assistant Examiner*—Andrew Joseph Rudy
(74) *Attorney, Agent, or Firm*—James A. Harrison; Bruce E. Garlick

(57) ABSTRACT

A system and method for building GUI screens for a time keeping and expense tracking system includes a time keeping and expense tracking (TKET) server that includes computer instructions that define logic for building GUI screens according to user definitions, communication channel throughput capacity, and terminal capacity. Initially, the TKET server examines a user's ID to determine his group affiliations and ability levels for modifying the parameters, objects and layout of a GUI screen. Thereafter, the TKET server allows the user to make changes according to his defined abilities. In one embodiment of the invention, the TKET server is operable to act as a remote time clock. Accordingly, the TKET server is formed to receive and interpret signals that define the user ID, an account code, and whether a start or stop timekeeping event has been selected. Thus, by way of example, a user may dial a specified number and may respond to, either questions generated by an IVR or to text generated by the TKET server to enter his ID, his account code, and whether he is selecting for the timekeeping function to start or stop. The TKET server then tracks time and stores the user time entries according to user ID, and according to account code. The TKET server further is operable to generate reports totaling the same. The TKET server also generates GUI display screens in a format representing tabbed index cards wherein the displayed tabs represent organizational information for which the user has atomic abilities to access the information.

15 Claims, 13 Drawing Sheets

| DISPLAY MODULE | | 1300 |
|---|---|---|
| FULL | REDUCED | MINIMAL |
| ISDN<br><br>56k+<br><br>T1, T3, etc.<br><br>3G Wireless | < 56k+<br><br>Wireless prior to 3G | Satellite |
| Number of Gateways< A | A ≤ (No.) of Gateways ≤ B | B < Number of Gateways |
| U.S. and Canada | Central Amer., South America and Europe | Far East<br>Middle East<br>Australia<br>New Zealand |

1316 → (row 1)
1320 → (row 2)
1324 → (row 3)

|   | COMPANY XYZ | | | | |
|---|---|---|---|---|---|
| 1416 → | DIVISION A | | | DIVISION B | |
| 1412 → | DEPT 1 | DEPT 2 | DEPT 3 | DEPT 1 | DEPT 2 |
| 1408 → | GRP 1<br>EYEE1<br>EYEE2 | GRP 1<br><br>GRP 2<br><br>GRP 3 | GRP 2<br>EYEE1<br>EYEE2<br>EYEE3<br>EYEE4<br>EYEE5<br>EYEE6 | GRP 1<br><br>GRP 2 | GRP 2<br>EYEE1<br>EYEE2<br>EYEE3<br>EYEE4 |
| 1404 → | GRP 2<br>EYEE1<br>EYEE2 | | | | |

FIG. 14

REPORTER ID TYPE
AUTH. TO REVIEW _____

MANAGER ID TYPE
AUTH. TO REVIEW _____
AUTH TO EDIT _____

SYSTEM ADMIN TYPE
AUTH TO REVIEW _____
EDIT GUI SCREEN TYPE _____

EMPLOYEE ID TYPE
AUTH TO EDIT OWN TIME _____
FOR FOLLOWING GROUPS _____

FIG. 15

| | XYZ CO. | DIV. A | DIV. B | DIV. C | DIV. D | DIV. E | DIV. F | DIV. G |

TRADEMARK

*XYZ COMPANY*
*123 ADDRESS*
*CITY, STATE ZIP*

*TAG LINE*

| DIV | CAT 1 | CAT 2 | CAT 3 | CAT 4 |
|-----|-------|-------|-------|-------|
| A   | 784   | 675   | 562   | 212   |
| B   | 482   | 334   | 434   | 115   |
| C   | 332   | 112   | 556   | 110   |
| TOTALS | 1598 | 1121 | 1552 | 437 |

FIG. 16A

| DIV. D | DIV. E | DIV. F | DIV. G |

D DIVISION REPORT

*XYZ COMPANY*
*123 ADDRESS*
*CITY, STATE ZIP*

*TAG LINE*

|       | CAT 1 | CAT 2 | CAT 3 | CAT 4 |
|-------|-------|-------|-------|-------|
| GRPA  | 211   | 175   | 142   | 056   |
| GRPB  | 121   | 083   | 112   | 033   |
| GRPC  | 088   | 044   | 039   | 033   |
| TOTALS | 420  | 302   | 293   | 122   |

FIG. 16B

TIME KEEPING AND EXPENSE TRACKING SERVER THAT INTERFACES WITH A USER BASED UPON A USER'S ATOMIC ABILITIES

CROSS REFERENCE TO RELATED APPLICATION

This application is related to, incorporates by reference, and claims priority to the filing date of the following application filed by Finch, et al.: "TIME KEEPING AND EXPENSE TRACKING SYSTEM HAVING CUSTOMIZED GRAPHICAL USER INTERFACES", said application having been filed on Jan. 31, 2000 and having a Ser. No. of 60/179,218.

This application is related to and incorporates the following applications by Finch et al. filed concurrently herewith in the United States Patent and Trademark Office on Jun. 29, 2000:

1. "METHOD AND APPARATUS FOR WIRELESS WEB TIME AND EXPENSE ENTRY VIA TIME KEEPING AND EXPENSE TRACKING SERVER ACCESS" having Ser. No. 09/606,438;
2. "METHOD AND APPARATUS FOR A WEB BASED PUNCH CLOCK/TIME CLOCK" having Ser. No. 09/606,435;
3. "METHOD AND APPARATUS FOR PROVIDING FREQUENT FLYER MILES AND INCENTIVES FOR TIMELY INTERACTION WITH A TIME RECORDS SYSTEM" having Ser. No. 09/606,385;
4. "METHOD AND APPARATUS FOR PROVIDING PROMPT PAYMENT FOR TIME ENTRIES ENTERED BY WAY OF A TIME RECORDS SYSTEM" having Ser. No. 09/606,436;
5. "METHOD AND APPARATUS FOR MONITORING CONTRACTOR PERFORMANCE" having Ser. No. 09/606,437;
6. "A TIME KEEPING AND EXPENSE TRACKING SERVER THAT GRANTS ACCESS TO RECORDS BASED UPON A USER'S ATOMIC ABILITIES" having Ser. No. 09/606,439;
7. "METHOD AND APPARATUS FOR WIRELESS WEB TIME KEEPING AND EXPENSE ENTRY WITH A CALENDAR PROGRAM/PERSONAL ORGANIZER" having Ser. No. 09/606,386;
8. "METHOD AND APPARATUS FOR UNIQUELY IDENTIFYING HARD COPY TIME SHEET FOR CROSS REFERENCE TO SYSTEM RECORDS" having Ser. No. 09/606,436.

BACKGROUND

1. Technical Field

The present invention relates generally to computer based time keeping and expense tracking systems, and more particularly to such a system that may be customized on an entity, group, project, user or other basis.

2. Related Art

The tracking of workers' time has been required since workers began working on an hourly basis. An early example of hourly time tracking was the punch clock system in which a time card was assigned to each worker. Upon commencing work, the worker had his or her card punched by a clock so that the work starting time could be recorded. Then, upon ceasing work starting time could be recorded. Then, upon ceasing work, the worker had his or her card punched again so that the work ending time could be recorded. From these starting and stopping times, a record could be constructed for a larger time period, e.g., a weekly period, a bi-weekly period, etc. This record was then used in preparing a paycheck for the worker and in creating other records relating to the time worked by a partial or complete work force.

While the punch clock system worked admirably in a factory environment in which all workers worked in a single location, time keeping was more difficult where a workforce was distributed. For example, employment agencies specialize in placing workers in contract positions within different organizations that also have their own employees. A contract employee, while being paid by an employment agency, reports to an employee (usually a supervisor) within the company. The contract employee creates a time sheet based upon the work he or she performs and then passes the time sheet to his or her supervisor at the company for approval. When the supervisor approves the time sheet, the supervisor passes the time sheet to the employment agency. The employment agency then receives the time sheet and typically inputs the time sheet into a computer that produces a paycheck for the employee and bills the company for the employee's time. This process is slow, tedious, prone to errors and expensive. The cost of the overhead associated with this process may easily exceed twenty percent of the revenue that the employment agency receives for the employee.

Another difficulty relating to time keeping relates to distributed work forces. Distributed work forces are now the norm, instead of the exception, not only for employment agencies but for companies as well. In a distributed work force, employees/contractors may be distributed worldwide. Each employee/contractor is required to submit time sheets for each pay period. These time sheets are received at a central accounting office, the time entries contained thereupon are then input into a computer system, paychecks are produced, reports are produced, and invoices are produced when required. While faxing or emailing time records to the central accounting office may expedite these operations, substantial effort must be expended in the process.

Organization of time records is another difficulty faced in time keeping. While all employees may work for a single company, the employees may work for different divisions, in different departments, and for different supervisors within the same department. Time records must be segregated according to this organizational structure for accounting and budget tracking purposes. Further, in an employment agency scenario, the employment agency may service tens or hundreds of companies. While each of the contractors works for, and is paid by the employment agency, invoices must be submitted to the appropriate company. Further, within a particular company, a single contractor may work on more than one project, in more than one division, and for more than one supervisor. The contractor's time must be segregated accordingly when the invoice is submitted. To further complicate this effort, the contractor may be paid at different rates for this work, depending upon the project, division, etc. These complexities further increase the difficulty in not only paying the employee but in generating an invoice for the company.

Expense tracking includes its own difficulties, some of which are shared with time tracking. Expense reports must be prepared on a periodic basis for each member of a workforce, whether he or she is an employee or contractor. These expense reports must be received by an accounting department, allocated to the proper account, and reimbursement checks must be prepared. With a distributed workforce, at least those difficulties described above apply. Proper accounting of expenses and invoicing when required also introduces difficulties to the process. As may be seen, current systems do not readily facilitate time entry and monitoring for modern workforces that have employees that are continuously going from site to site.

Thus, there is a need in the art for a timekeeping and expense tracking system that overcomes the shortcomings cited above as well as other shortcomings of the prior systems.

SUMMARY OF THE INVENTION

Thus, to overcome the shortcomings of the prior systems, among other shortcomings, a timekeeping and expense tracking ("TKET") system constructed according to the present invention provides a plurality of users with the ability to access the system via the Internet and via other wireline and wireless communication networks. The TKET system resides upon at least one server computer coupled to the Internet and supports access from computer systems, web enabled telephones, personal data terminals, and other enabled devices including wireless personal digital assistants (PDAs). The TKET system may therefore be accessed from both wired and wireless devices. In one embodiment, users employ browser software to access the TKET system and require no specialized client software.

In order to support the many and varied needs of companies using the TKET system, the TKET system supports configurable graphical user interface screens ("GUI screens"). GUI screens are those displays provided to users of the TKET system when the users access the TKET system. Via the GUI screens, the users input their time and expense records. The GUI screens are configurable to alter the objects presented, the layout of the objects and information presented, the color schemes presented, the timekeeping or expense tracking information required from the user, and in other ways that cause the TKET system to be more effective.

GUI screens may be customized on a company-by-company basis, a department-by-department basis, a group-by-group basis, a project-by-project basis, and a user-by-user basis or upon another basis. A single TKET system may be used to service the time keeping and expense tracking needs of a plurality of companies, each of which has a plurality of divisions, a plurality of departments, a plurality of groups and a plurality of employees/contractors. Thus, the configurability of the TKET system allows differing GUI screen presentations to be created and presented such that each group of users is employing a different system.

GUI screen preferences for sets of users of the TKET system may be organized in a hierarchical basis to simplify the GUI screen creation and presentation operations. In a GUI screen preference hierarchy, a top level of the hierarchy possesses a respective set of GUI screen preferences that are sufficient to create a user's GUI screen. Each lower level on the hierarchy also possesses a respective set of GUI screen preferences. Each user serviced by the TKET system resides at a particular location on the hierarchy. With this hierarchy position determined, a GUI screen may be created for the user. In creating the GUI screen, the user's location in the hierarchy determines his ability level for making changes because he inherits the GUI screen preferences of all other higher level users in the hierarchy. However, GUI screen preferences of successively lower levels of the hierarchy displace conflicting GUI screen preferences of higher levels of the hierarchy. Thus, a GUI screen for a particular user of the TKET system will have his or her GUI screen preferences determined along a top to bottom hierarchy path.

The TKET system also generates GUI screens depending upon the type of terminal from which a user accesses the TKET system and the connection over which the user accesses the TKET system. A GUI screen created for the user when the user accesses the TKET system from a palm-top computer is simpler than a GUI screen created for the user when the user accesses the TKET system from a desktop computer. Further, when the user accesses the TKET system from a wireless device, the bandwidth of the available data path from the TKET system to the user's terminal will also be considered. A less complex GUI screen will be created and provided to the user when lesser bandwidth is available over which to transmit the GUI screen to the user. This operating feature is particularly important when the user accesses the TKET system from a wireless device.

The invention further includes interfacing the TKET server with a calendar application that is hosted on a user terminal that comprises either a desktop computer, a laptop computer or a PDA. In one embodiment of the invention, the TKET server communicates directly with the calendar application if the TKET server knows the communication protocol for the specific calendar type. In another embodiment of the invention, an application is installed into the user terminal that serves as an interface between the TKET and the calendar application.

Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered in conjunction with the following drawings, in which:

FIG. 13 is a table determining whether to generate a set of signals for displaying either a full, reduced or minimal GUI screen display based upon communication path characteristics according to one aspect of the present invention.

FIG. 14 is a flow chart that illustrates a method according to the present invention.

FIG. 15 is a flow chart illustrating an inventive method for receiving time tracking signals from a telecommunication switch according to a preferred embodiment of the invention.

FIGS. 16A and 16B illustrate a method for providing access to timekeeping and expense tracking information according to one embodiment of the present invention.

DETAILED DESCRIPTION OF THE DRAWINGS

Figure 1:
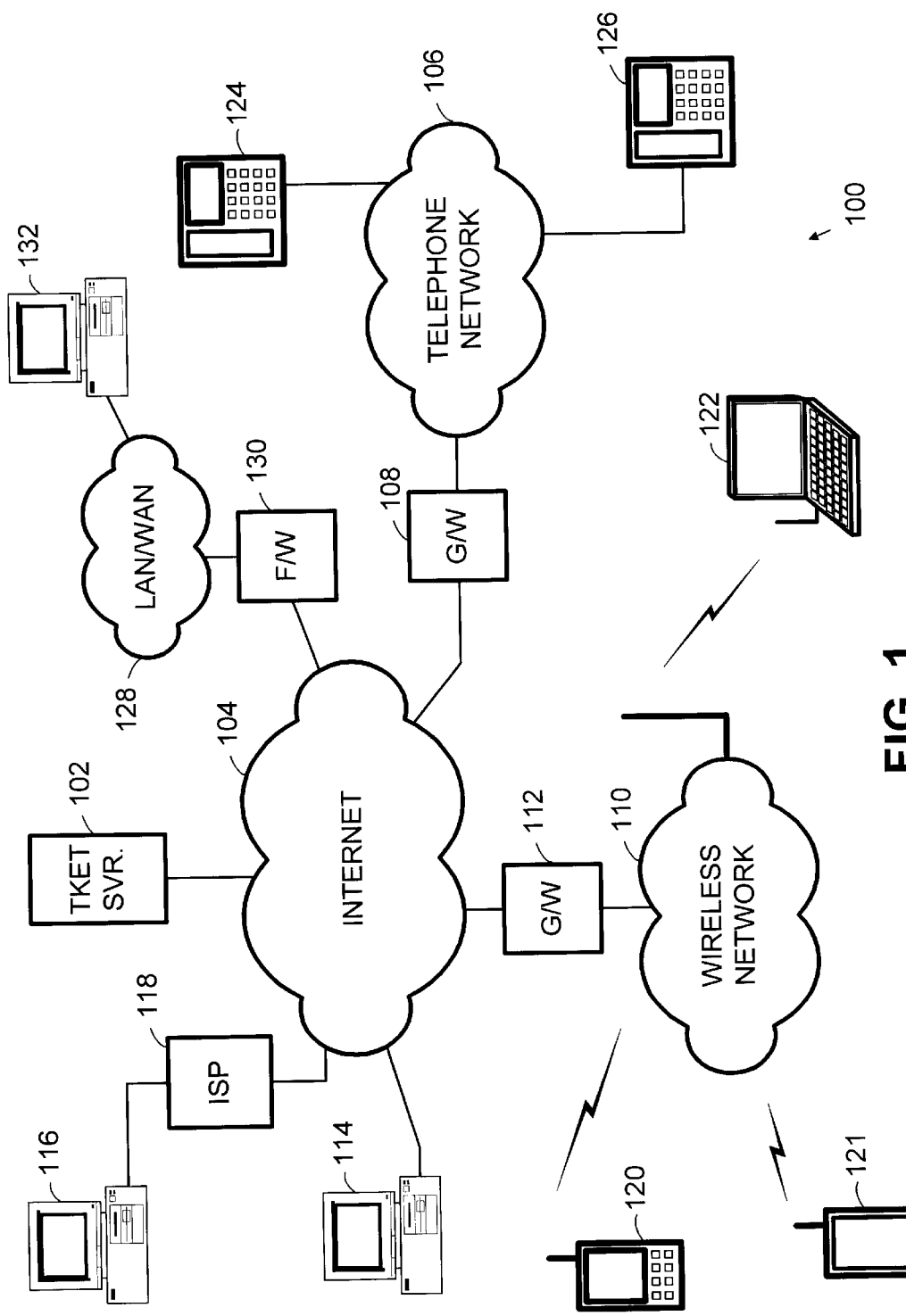
FIG. 1 is a system diagram illustrating a multimedia electronic mail system constructed and operating according to the present invention.

FIG. 1 is a system diagram illustrating a time keeping and expense tracking (TKET) system 100 constructed and operating according to the present invention. A TKET server 102 couples to the Internet 104 (World Wide Web) and converses with all other devices using one or more packet switched protocols supported by the Internet 104. A telephone network 106 (which may be the public switched telephone network ("PSTN") or another telephone network couples to the Internet 104 via a gateway 108. Further, a wireless network 110 couples to the Internet 104 via a gateway 112. The manner in which the Internet 104 (or other packet switched networks) couples to the telephone network 106 and to the wireless network 110 is generally known. Thus, the interaction between the Internet 104 and the other networks 106 and 110 will be described only as it relates to the present invention. And, of course, the structure illustrated in FIG. 1 is an example structure. Other structures may be constructed and operate according to the present invention to support time keeping and expense tracking operations.

Computers 114 and 116 couple to the Internet 104 and may interact with the TKET server 102 through this connection. While computer 114 has a direct connection to the Internet 104, computer 116 must access the Internet via an Internet Service Provider (ISP) 118. Many users currently access the Internet via an ISP, as illustrated with the connection for computer 116. However, some computers currently access the Internet via an Intranet or other coupling network. In this construction, an ISP may not be required. Further direct connections to the Internet are already possible such as shown with computer 114. Thus, simply stated, the structure illustrated in FIG. 1 provides a platform of operation for the present invention but must not be construed to limit the teachings of the present invention.

Web-enabled telephones 124 and 126 couple to the telephone network 106. These telephones 124 and 126 each have displays upon which a GUI screen may be presented to the user. The telephone network 124, as was previously described, may be the PSTN, which transmits data in a Pulse Code Modulation (PCM) format. In another embodiment, the telephone network 124 may be a packet switched network that supports packet-based communications. The teachings of the present invention, therefore, apply equally well to current or future telephone network technology.

Wireless devices 120, 121 and 122 wirelessly connect to the wireless network 110. The wireless network 110 may be cellular based, satellite based or otherwise structured to provide wireless communication service within a service area. Wireless device 122 is a portable computer that services communications over a wireless link to the wireless network 110. Wireless devices 120 and 121 are personal data assistants that wirelessly communicate with the wireless network 110. The wireless network 110 communicates with the Internet 104 via the gateway 112.

A local area network/wide area network (LAN/WAN) 128 couples to the Internet 104 via a firewall 130. At least one computer terminal, e.g., computer 132, couples to the LAN/WAN and may communicate with the TKET server 102 via the LAN/WAN 128 and the Internet 128. The LAN/WAN may be supported by a company, a service provider or another organization.

The TKET server 102 may be operated by a single company or a plurality of companies that use the TKET server 102 to support its timekeeping/expenses. Alternately, the TKET server 102 may be operated by an application service provider (ASP) that sells timekeeping and expense services to a plurality of customers. The timekeeping services provided by the ASP may be bundled with other services so that the ASP provides a suite of services to its customers.

According to the present invention, a plurality of users accesses the TKET server 102 via differing communication paths and using differing terminal devices. Time and expense information is uploaded from the terminal devices to the TKET server 102 where it is stored and later used to generate invoices, paychecks, reports, and other alternate records. Because the TKET server 102 is accessible from any location having Internet 104 access, the TKET server 102 provides ubiquitous service worldwide. Thus, the TKET server 102 as easily services distributed workforces as it does centralized work forces. For example users at terminal devices 120, 132 126 and 116 may work for a single employer/contractor at differing physical locations. However, in reporting time and expense information, they simply access the TKET server 102 via respective network connections.

A single user may use multiple and differing terminal devices to access the TKET server 102. Because of this, the user is not precluded from entering his or her time from a single terminal device. While the user is traveling, he or she may use a portable computer 122 or personal data assistant 121 to enter time. However, while working or at home, the user may use his or her personal computer 114 to enter time and expense information. Thus, as compared to prior timekeeping/expense systems, the TKET server 102 provides a centralized service environment that is not limited by the users' equipment.

The design of the present invention is particularly advantageous in that it allows an employer to monitor time keeping and expense tracking in a real-time manner. Stated differently, by requiring an employee to access the system to enter his start and stop ties, the system serves as a time clock.

Moreover, the system includes the flexibility of allowing an employee (user) to enter previously worked by un-entered time. For example, an employee may need to enter travel time.

With respect to the time clock feature of the invention, a GUI screen for a user of a wireless PDA terminal 121, for example, may have separate objects for start and stop times. Thus, the PDA may be programmed to establish a connection with the TKET server and to automatically upload a start or stop time when so requested by the user. With the present system, a PDA may serve as a portable time clock for the user to help him track his time.

Continuing to refer to FIG. 1, TKET server 102 generates communication signals 134 that are to be delivered to any one of the plurality of terminals shown in FIG. 1. The communication signals 134 are created in a form to trigger terminal user software to generate displays containing information defined within communication signals 134. For example, communication signals 134 may include signals in a form that trigger and that can be used by a plurality from terminal software to create a GUI screen. The form of the communication signals 134 and the content therein directly affect the display at the receiving terminal. For example, communication signals 134 actually comprise a large number of signals or information that result in a specified GUI screen being displayed on the terminal display. Thus, either for a terminal having a limited capacity for receiving and handling large amounts of information or for a network path having low bandwidth data throughput capacity, the magnitude or total amount of signals that comprise communication signals 134 will be reduced thereby resulting in the display of a reduced GUI screen page. In the case, by way of example, of a mobile terminal, the signals within communication signals 134 may be so limited that little more than text is transmitted to the terminal.

The communication signals 134 also include control information to prompt the receiving terminal to generate a response indicating a user selection of options or questions asked within the GUI screen for the response signals 136 are received by TKET server 102.

For most user terminals, the response signals 136 use the hypertext transfer protocol (HTTP) that is used by web servers and client browsers to communicate over the World Wide Web. Generally, the protocol is used for moving documents around the Internet. Additionally, terminals usually employ hypertext mark-up language (HTML) for creating World Wide Web pages. Accordingly, the TKET server 102 can estimate the capabilities of the terminal, and perhaps the transmission data path from the HTTP and HTML information that is received as a part of response signals 136. As will be explained in greater detail herein this application, TKET server 102 determines the characteristics of the GUI screen display that are to be created at the user terminal according to the content of response signals 136. In addition to the HTTP and HTML information from which TKET server 102 may infer terminal or communication path capabilities, an actual synchronized address selection by the user to which response signals 136 are being routed may be used, in an alternate embodiment, by the TKET server 102 in determining GUI screen display characteristics. Alternatively, response signals 136 may merely include an indication of a user selection from which a corresponding GUI screen display is generated.

Other factors are also used by TKET server 102 to determine what GUI screen display signal characteristics are appropriate. By way of example, the TKET server 102 is operable to determine the number of gateways in the transmission path between it and the user terminal from examining the http information associated with a received signal. For example, the network of FIG. 1, a Gateway 108 is shown to exist in the path between TKET server 102 and telephones 124 and 126 of telephone network 106. Between TKET server 102 and user terminal 122, there not only exists a Gateway 112, but also a wireless network 110 that introduces substantial propagation delays. Accordingly, by determining how many Gateways exist in the path and other characteristics of the path such as whether the communication signals are being routed through a telephone network 106, a local area or wide are network 128, or a wireless network 110, as well as the number of Gateways through which communication link passes, TKET server 102 is able to determine an approximate value for through put capacity. For example, merely having to go through a wireless network 110 might, in the described embodiment, result in TKET server 102 transmitting, at most, a reduced set of display signals for forming a reduced GUT screen display.

Figure 2:
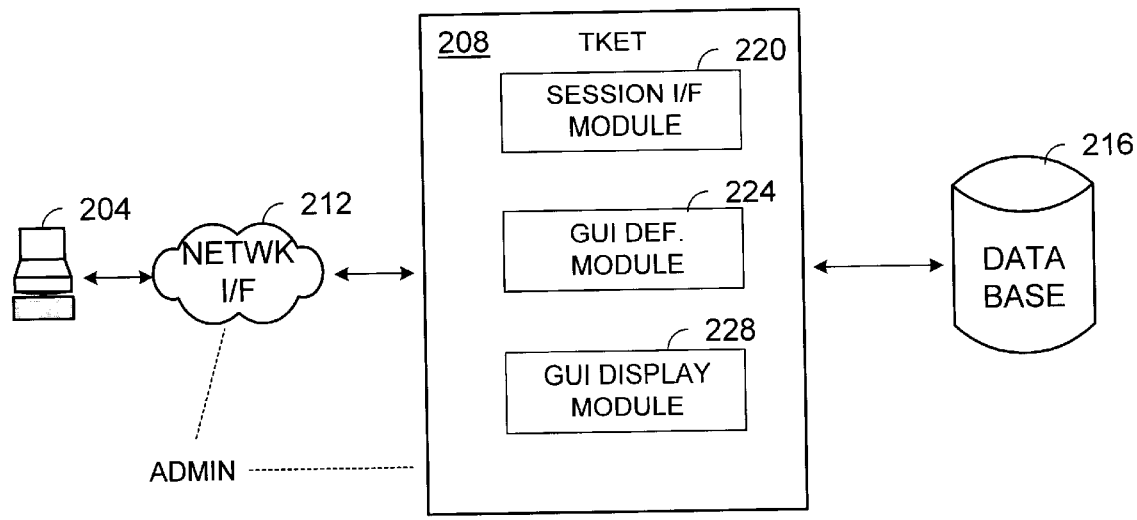
FIG. 2 is a functional block diagram illustrating a TKET server coupled to a user terminal according to the present invention.

FIG. 2 is a functional block diagram illustrating a TKET server coupled to a user terminal according to the present invention. A user terminal 204 communicates with TKET server 208 by way of interface 212. Interface 212 may comprise any combination of an ISP, a gateway and an Internet, a wireless network, a PSTN or any other communication network. TKET server 208 also is coupled to database 216 that is for storing user information including user selected GUI screen display parameters.

TKET server 208 comprises a session interface module 220, a GUT screen definition module 224 and a GUT screen display module 228. Each of these modules operates in concert to support the disclosed invention herein. To illustrate, GUT screen definition module 224 is for storing default GUT screen page parameters and GUT screen display definition information for creating GUI screen pages on a user terminal display. Additionally, module 224 includes information for defining logic for rearranging, renaming, adding, and deleting time entry or expense tracking components. The specific logic contained therein is better explained in the discussion of the figures that detail operation of the invention.

The inventive system is operable to enable a user to customize the GUI screen displays to a degree not seen in other display systems, and more particularly, in time and expense tracking systems. To enable the user to select display parameters, the inventive system includes a GUI screen display module 208 that creates GUI screen displays according to the definition information stored in GUI screen definition module 224. Additionally, GUI screen display module includes logic for creating displays according to the display parameters selected by the user that are stored within database 216.

Database 216 is for storing customized display parameters selected by a user. For example, the number, arrangement and names of elements within the rows and columns of a GUI screen display page on a per user basis are stored within database 216. In the preferred embodiment of the invention, database 216 is for storing multiple display pages for each user that requires multiple pages.

By way of example, a user may want to define multiple GUI screen pages for display on his terminal screen according to the terminal type. If the user, for example, typically accesses his time and expense tracking system either with a PDA or with a desktop computer terminal, his display capabilities will vary according to the capacity of the terminal in terms of bandwidth, memory, and display processing throughput capacity. Accordingly, database 216 is formed to include software instructions and memory capacity to store multiple GUI screen display pages according to user need and GUI screen display module 208 is formed to include logic for selecting between the multiple GUI screen pages.

In addition to database 216 that stores multiple display pages for each user, session interface module 220 is for determining the terminal type through which the user is accessing the TKET server 208. More specifically, session interface module 220 includes software instructions that define logic for determining the bandwidth and terminal type of the user terminal. The session interface module 220, in one embodiment, produces a GUI screen selector signal for the GUI screen display module 228 to determine what GUI screen display is to be created for the user terminal 204 the GUI screen selector signal.

There are many different ways in which the session interface module 220 may determine the user terminal type. In one embodiment of the invention, the user specifies his terminal type by selecting a corresponding URL when accessing the TKET server 208. By way of example, the user is instructed to use a first URL for accessing the TKET 208 when the system is being accessed with a PDA and a second URL when the system is being accessed with a desktop or laptop computer.

In another embodiment of the invention, a terminal ID is transmitted to the TKET server 208 that identifies the terminal type. For this embodiment, session interface module examines the contents of a database, e.g., database 216, to determine the terminal type based upon the terminal ID. In yet another embodiment of the invention, the user is given an option to select from one of several GUI screen display modes. For example, the user may be given the option to select either a FULL or REDUCED GUI screen display wherein the display modes relate to the capacity of the user display terminal.

As another aspect of the invention, the session interface ID module examines the signal path through which the GUI screen page is to be delivered to the user terminal. For example, if the signal path includes a wireless branch, it may determine to transmit a GUI screen page that would have a smaller memory or data transport capacity requirement.

In yet another embodiment of the present invention, the session interface module transmits a signal to the user terminal to measure a response time. The GUI screen display module then selects GUI screen display page types according to the response time. For this embodiment, it is assumed that a response time corresponds to a network data transport capacity. Accordingly, a GUI screen page requiring the transmission of lesser amounts of data is selected for those network paths whose transport speed is lower.

In operation, a user connects to TKET server 208 with his terminal 204 to enter or review time and/or expense information. Session interface module 220 determines the user terminal type, if necessary, by sending a message to the user to prompt the user to select a GUI screen display page type or mode. The GUI screen display module then builds and transmits a GUI screen display page based upon the GUI screen selector signal value created by the session interface module 220 and based upon the user specific GUI screen page information stored within database 216.

The above described embodiment includes having multiple GUI screen pages for each user, if necessary. In an alternate embodiment, each user defines only one GUI screen page. The parameters of the page include graphical information including unique fonts, color patterns, graphical symbols and related spacing and layout of all of these GUI screen page elements and aspects. If, however, the GUI screen selector signal indicates that the user terminal has a reduced data capacity in terms of processing speed or memory, the GUI screen display module builds a GUI screen display page that omits certain elements of the page. For example, if the user terminal type is a PDA having only "black and white" color capability, the GUI screen display module would build a GUI screen page without color information. Additionally, the GUI screen display module may build a GUI screen page that omits certain graphical signals. Thus, for this embodiment, the GUI screen page is said to be "implied" from the stored GUI screen page.

In yet another alternate embodiment of the invention, the GUI screen display module builds a page based upon one of several different user created GUI screen pages stored within database 216. For example, if the GUI screen selector signal indicates that the smaller (in memory size) of the two GUI screen pages is to be built for transmission to the user terminal, the GUI screen display module may still build a GUI screen page whose elements are implied from the selected GUI screen page. To illustrate, the user may have selected a smaller GUI screen page, but based upon the user terminal type, the amount of information of the smaller GUI screen page may still exceed the capacity of the user terminal. Thus, an even more limited GUI screen must be created or "implied" from the selected screen. For example, if the user terminal is a cellular device having limited display and data processing capability, the GUI screen page may be reduced to being little more that a string of alphanumeric characters even through the selected server was a "REDUCED" GUI screen.

Figure 3:
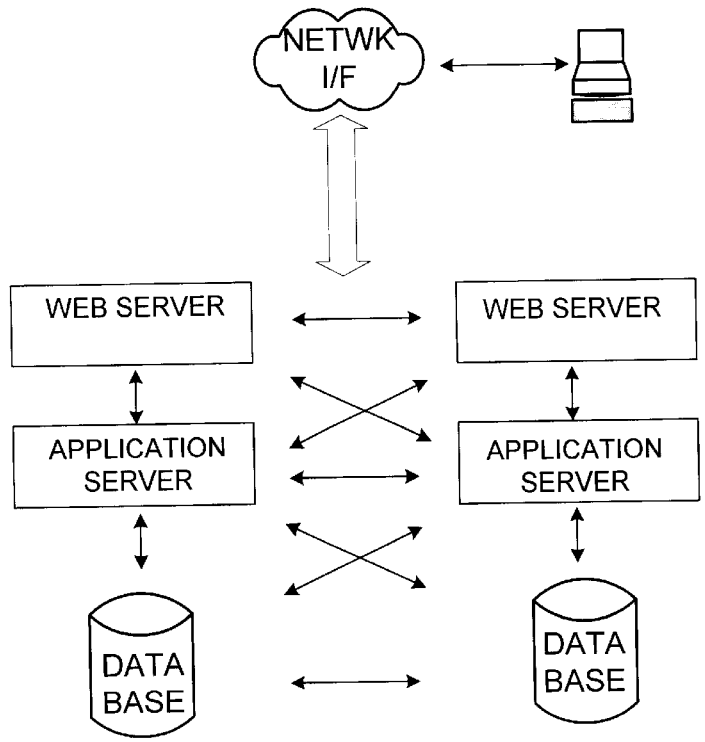
FIG. 3 is a functional block diagram that illustrates an expanded TKET server system coupled to a user terminal according to one aspect of the present invention.

FIG. 3 is a functional block diagram that illustrates an expanded TKET server system coupled to a user terminal according to one aspect of the present invention. The system of FIG. 3 is similar to that shown in FIG. 2 except that the TKET server of FIG. 2 is replaced by a network of TKET servers. Primarily, the network of TKET servers shown generally at 300 illustrate that the components (individual TKET servers) of the TKET server network are coupled to communicate with each other to produce a scaleable TKET server network that can be formed to satisfy system requirements. As may also be seen, the TKET server network comprises application servers that are coupled to the users through a plurality of web servers.

Figure 4:
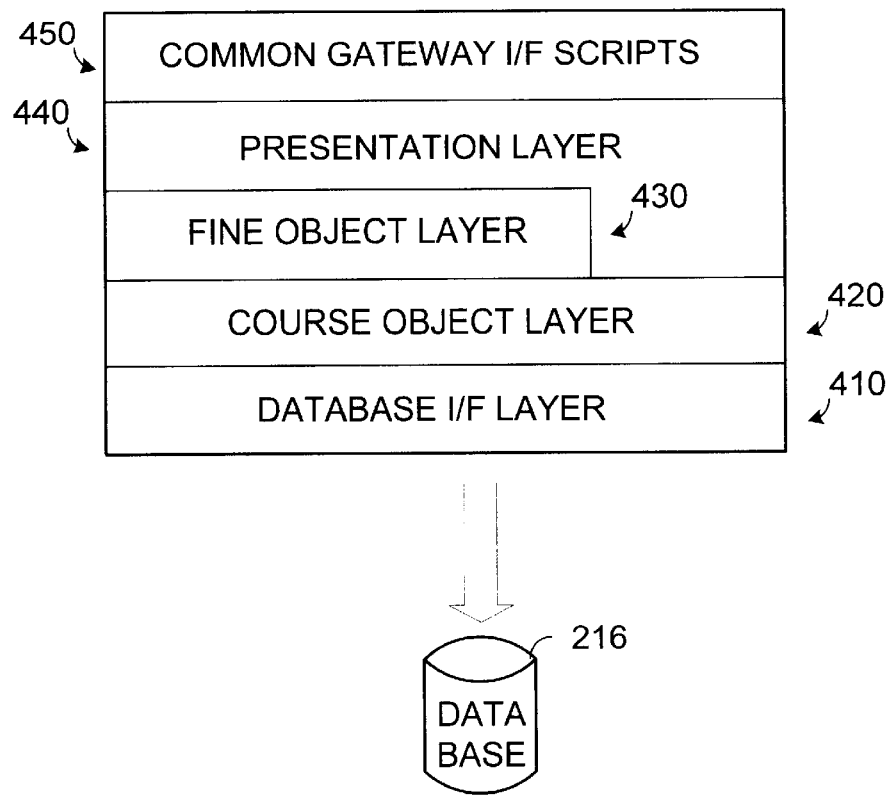
FIG. 4 is a software system configuration chart that illustrates to various software layers according to an embodiment of the invention.

FIG. 4 is a software system configuration chart that illustrates to various software layers according to an embodiment of the invention. More specifically, the chart of FIG. 4 illustrates relative arrangement and each layer represents different levels of abstraction with respect to the software and its functionality in a TKET server.

The lowest level layer is the database interface layer 410. Database interface layer 410, as its name implied, is the layer at which computer instructions cause a TKET server processor to interact with a database 216 within a storage device to obtain specific user selected GUI screen display parameters as well as stored user data. The second layer is the coarse object layer 420. The course object layer 420 is the layer at which the programmer can access a whole table of objects as one object.

The third layer is the fine object layer 430. The fine object layer is the layer at which single objects represent one user, one project, or one such other object in the system. The fourth layer is the presentation layer 440. A presentation layer is a layer at which HTML, WAP or HDML is prepared for the user and user input is passed back to the program. For example, the computer instructions at the presentation layer are those instructions that prompt a processor to generate the appropriate type of GUI screen. The fifth layer is the common gate interface (CGI) script layer 450. CGI layer 450 is the layer at which presentation data is passed up to the web server.

Figure 5:
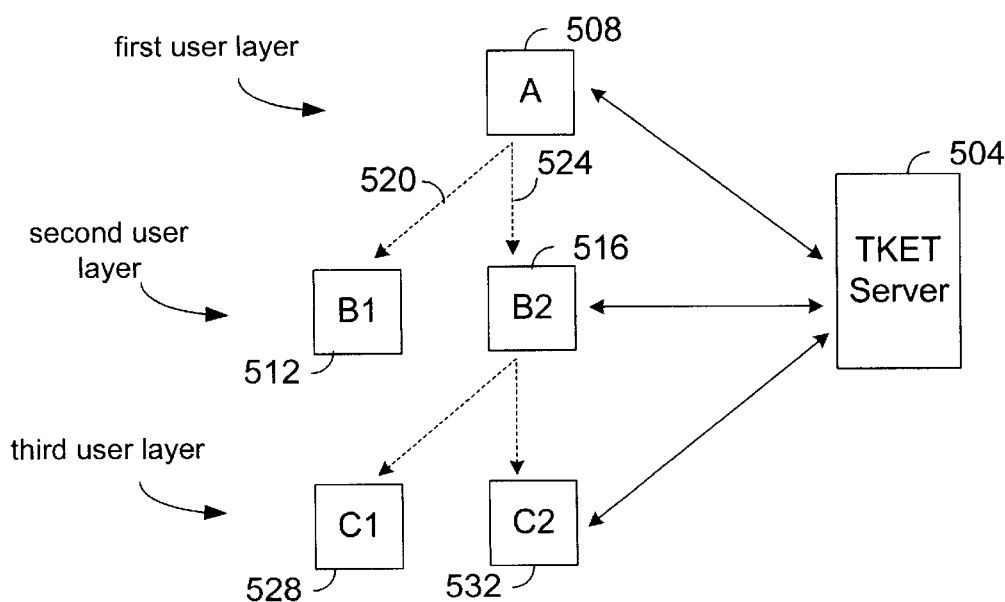
FIG. 5 is a functional block diagram illustrating the relationship between users with respect to a TKET server formed according to the present invention.

FIG. 5 is a functional block diagram illustrating the relationship between users with respect to a TKET server formed according to the present invention. TKET server 504, an application server, is coupled to communicate with a plurality of users by way of a communication network. A user of TKET server 504 is coupled to communicate with a user terminal 508 and to transmit GUI screen displays thereto. Additionally, user terminals 512 and 516 are coupled to communicate with TKET server 504.

Dashed lines 520 and 524 are shown between user terminal 508 and user terminals 512 and 516 to illustrate a business relationship between the users of the respective user terminals. By way of example, if the user of user terminal 508 desires to establish a time management and tracking service and to establish a service relationship with the Operator of TKET server 504, then the user of user terminal 508 is, for the purpose of this example, the administrator for the time management and tracking company. Thus, the users of terminals 512 and 516 are the clients of the user of terminal 508. The letter "A" of FIG. 5 refers to a user of a first layer, while "B1" and "B2" refer to the first and second users of a second layer. "C1" and "C2" refer to the first and second users of the second layer.

In the illustration of FIG. 5, there also exists a business relationship between the users of terminals 512 and 516. For simplicity, an illustration of the business relationship between user terminals 528 and 532 and user terminal 516 is shown. User terminal 512 has business relationships with other lower ability users that are not shown herein.

One reason that the business relationships are indicated in FIG. 5 is to illustrate why each layer of users has different ability levels. Thus, for example, user 508 may be a director for the time keeping and expense tracking function subscribed or used by each of the lower ability level users 512, 516, 528 and 532 and supported by the operator of TKET server 504. Similarly, users 512 and 516 may be managers for the time keeping and expense tracking function. Users 528 and 532 may be mere users. Alternatively, they too may be managers having yet lower ability level users. For example, if each of the users 528 and 532 represent a company, each company may have organizational units such as section, departments, or divisions that are lower ability level users. A better understanding of the abilities of the different level users is explained in the discussion relating to FIG. 8.

Figure 6:
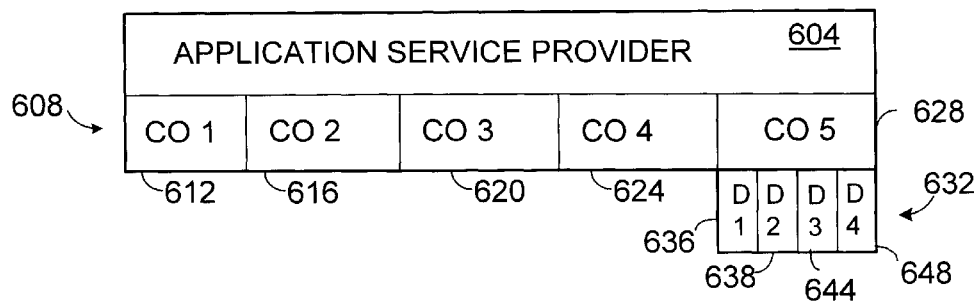
FIG. 6 is a chart that illustrates the hierarchical relationship between different users wherein the hierarchical relationships defined levels of ability to define the characteristics and arrangement of a GUI screen page according to a preferred embodiment of the invention.

FIG. 6 is a chart that illustrates the hierarchical relationship between different users wherein the hierarchical relationships defined levels of ability to define the characteristics and arrangement of a GUI screen page according to a preferred embodiment of the invention. The chart of FIG. 6 illustrates the relationship of three hierarchical ability levels of users and, more specifically, companies CO1 through CO5 and departments D1 through D4 of company CO5. The first hierarchical level shown generally at 604 represents an application service provider (ASP) that also serves as an administrator for the example shown herein. The administrator originally receives a GUI screen page that is set up according to a plurality of default settings. Being administrator, however, the objects of the GUI screen page may readily be modified by the ASP/Administrator.

The second hierarchical level shown generally at 608 includes five users 612, 616, 620, 624 and 628, each of which may have additional lower level users as shown at hierarchical level 632. For example, user 628 further includes four lower ability level users 636, 640, 644 and 648. While not shown specifically herein FIG. 6, each of the users of level 632 may also have additional lower level users. For example, if each user of level 632 represents a different company, there may still exists several lower layers according to the size of the company and the number and arrangements of the divisions of the company.

Continuing to refer to FIG. 6, each level of user receives a GUI screen page having a default arrangement and object labels and contents. According to the selections of all of the users above the present user in terms of what may or may not be modified, the present user may modify the arrangement and label values and well as content of the rows, columns and objects of the GUI screen page. A better explanation of the relative abilities of users is explained in the discussion of FIG. 8 below.

In general, however, each user receives a GUI screen page having a default set of values that is determined by the higher level of users. Thus, the ASP/Administrator of group 604 has a first set of default values. The users of group 608 receive GUI screen pages whose default settings are determined by the ASP/Administrator 604. Similarly, the lower level users of group 632 receive GUI screen pages whose default values are determined by the ASP/Administrator and by the higher level user of group 608 to which the user of group 632 belongs. For example, user 628 and ASP/Administrator 604 determine the default settings of users 636, 640, 644 and 648. In general, each hierarchical level of FIG. 6 has a different set of GUI screen default settings according to the relative placement of the user.

While the table of FIG. 6 illustrates only three levels of users, it is understood that there may be additional levels below the third level shown generally at 632. While there may not be any higher levels than shown in FIG. 6, it generally is possible to have additional levels in either direction if the highest level shown is not the ASP as is the case in FIG. 6.

The hierarchical relationship between the users affects more than screen definitions. More specifically, access control lists may be defined that specify access to specified information or lists of information. Generally, each user may transparently view the GUI screens of all lower level users. If a user belongs to multiple groups, for example, wherein there are a plurality of lower level users within each group, the user will have the ability to transparently review or even to modify the content of the GUI screen screens of the lower level users in each group. Each of the lower level users, however, can only review the GUI screen pages of their lower level users. They may not review the GUI screen pages of users at the same or at higher hierarchical levels. In such a case, the user is "hidden" from those users whose screens he cannot access.

Moreover, because project codes are similar to expense accounts, it is often desirable to allow the project codes to be viewed by lower level users in a selective manner. Thus, a user, e.g., a manager level user, may select what codes may be viewed by the users in a given group through the access control lists. If a lower level user also acts as a manager for his lower level users, the upper level manager will have access to view the codes and access control lists defined and controlled by the lower level manager.

The function of hiding project codes may also be performed on a per user basis through the use of the access control lists. Thus, a manager may specify in an access control list those lower level users that have access to a given code.

Figure 7:
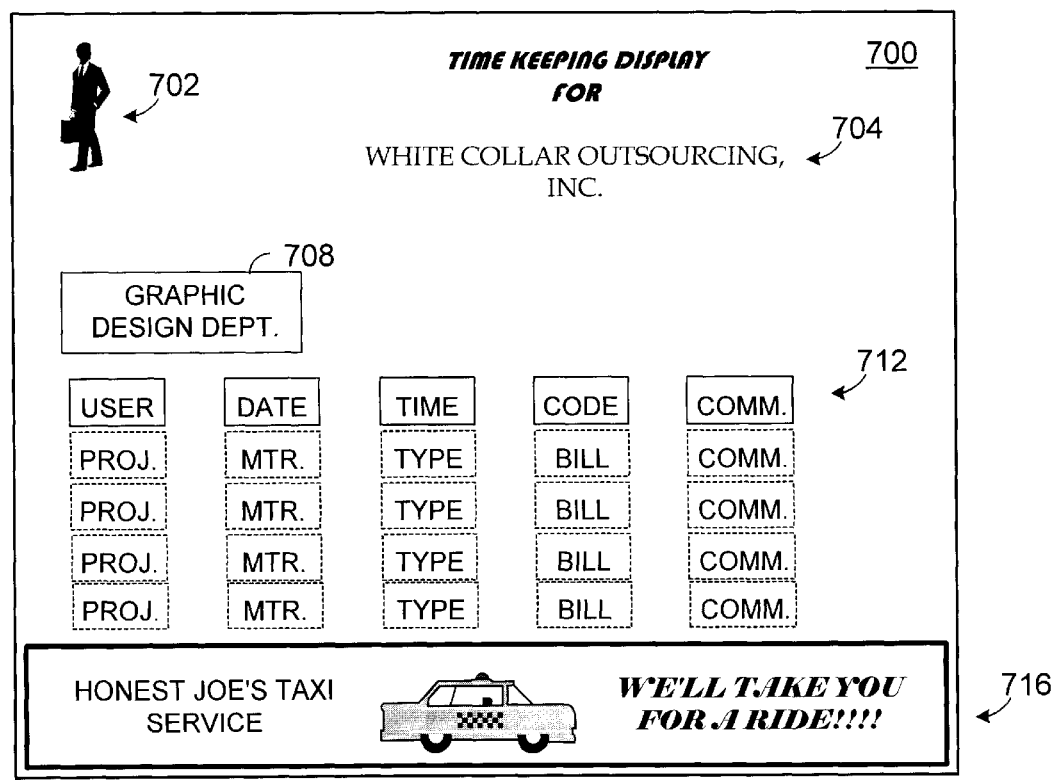
FIG. 7 is an exemplary display of a GUI screen according to one embodiment of the invention.

FIG. 7 is an exemplary display of a GUI screen according to one embodiment of the invention. The screen of FIG. 7 includes five groups of information 702, 704, 708, 712 and 716. As has been discussed above, different users have different ability levels in terms of the extent to which they may make selections for the characteristics of a GUI screen. The example of FIG. 7 illustrates a screen that is observed by a user not having the highest ability level. Thus, the screen received by the user of the screen of FIG. 7 includes groups 702, 704 and 708 whose objects are not modifiable. By way of example, group 702 includes an object reserved for displaying a corporate logo while group 704 includes an object of displaying a corporate name. Group 708 includes at least one object that includes departmental identifiers. Similarly, group 716 includes an object for displaying a banner or advertisement that may not be modified by the user of the screen illustrated in FIG. 7.

The objects of group 712, however, are modifiable by the user of the screen shown in FIG. 7. For the example herein, the objects of group 712 are for storing the actual time or expense entries. Moreover, the actual arrangement of the columns and rows of group 712 are modifiable. Thus, based upon user selection, rows may be displayed as columns or vice versa. Additionally, the actual names given to these rows or columns are modifiable. In the preferred embodiment of the invention, the screen is initially received by the user with a set of default names and values. Then, for each row or column, the user may activate a pull down menu to select from one of a group of alternate names. In an alternative embodiment of the invention, the user may also type in a name if one of the alternative names does satisfy the user's requirements. For example, a row labeled as "entertainment" may have alternate names including "dining", "alcohol", or "sporting events". In the alternate embodiment of the invention, the user may choose to type a label that does not exist such as "Golfing Fees" if, for example, the user entertains clients on the golf courses.

The TKET server 700 supports fully customizable GUI screens, which are the presentation, made to the user when requesting time entries and/or expense information. Each time entry typically includes at least five components: (1) an identity, e.g., the user's identity; (2) a corresponding date or date range for the time entry; (3) the duration of time for the time entry, or alternately starting and stopping times for the time entry; (4) elements of the time entry, e.g., project code, project sub-code(s), time categories and subcategories, etc., and (5) comments regarding the time entry. In the described embodiment, even the name, size and arrangement of the comments field (object) is configurable by the user. As may be seen from examining group 712 in FIG. 7, the top row of object titles represent the default settings that are provided by a higher level user while the dashed objects below the top row of object titles represent, more generally, that a pull down menu may used to allow the user to select from a list of object names for each object.

The chart of FIG. 7 illustrates, therefore, a time entry GUI screen session for an employee having the lowest ability level/role for defining the screen display parameters. The objects of group 712 may be arranged by the user in any order or may even be renamed by the user.

Figure 8:
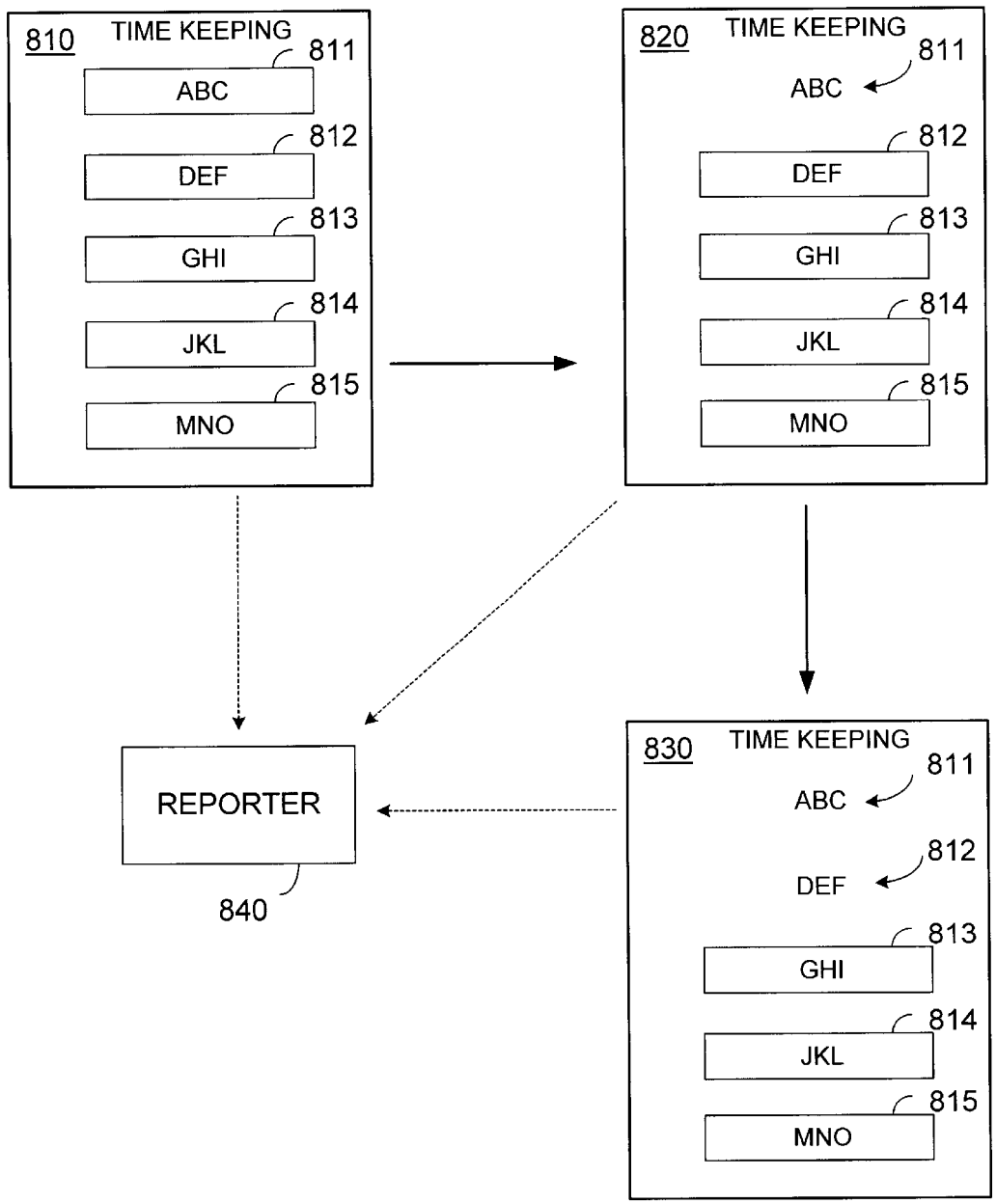
FIG. 8 is an illustration of a series of GUI screens that collectively illustrate a concept of users having differing and relative levels of atomic abilities for modifying the contents and arrangement of GUI screens according to one embodiment of the invention.

FIG. 8 is an illustration of a series of GUI screens that collectively illustrate a concept of users having differing and relative levels of atomic abilities for modifying the contents and arrangement of GUI screens according to one embodiment of the invention. Referring now to FIG. 8, each of the three GUI screens contains five rows and one column of objects. In the first GUI screen 810, it may be seen that all five objects 811 through 815 are highlighted (as indicated by the box around the object) to indicate that each of the objects may be modified. The GUI screen of FIG. 8 is one that is under the control of a TKEK server administrator having the highest level of ability to modify the objects within the screen. Accordingly, all five objects are modifiable by the user (administrator). An access list stored within the TKET server defines the access level of the user. From the stored access information, the TKET server determines that all five rows are modifiable by the user to whom the screen 810 is to be transmitted. Accordingly, each of the five objects is sent in a format to enable the receiving user to make modifications.

The screen shown at 820 shows the same five objects 511 through 815 of screen 810 but that only objects 812 through 815 are highlighted. That object 811 is not highlighted indicates that the user of screen 820 has a lower ability level and, more specifically, cannot modify the display the content of object 811. In general, if object 811 represents a value or symbol that the administrator does not want its lower level users to modify, then the contents of that object appear for all of the lower ability level users.

The screen shown at 830 also includes the same five objects but only objects 813 through 815 are highlighted illustrating that the user of screen 830 may not modify objects 811 and 812. While object 811 was made un-modifiable for both of the lower ability users of screens 820 and 830, the user of screen 820 made object 812 un-modifiable for the user of screen 830. While not explicitly shown in FIG. 8, it should be understood that there might well be additional screens that represent additional lower ability users. For example, the user of screen 830 may represent a company. In such a case, each of the lower ability screens would relate to organizational units of the company. No particular limit as to the number of ability levels is intended by the illustration of FIG. 8, which includes only three ability levels.

Continuing to refer to FIG. 8, it may be seen that a reporter 840 is coupled to receive each of the GUI screens 810, 820 and 830 from the user terminals displaying them. A reporter may be any type of device that is for storing or displaying information of the type being supported on each of the GUI screens. By way of example, if the system of FIG. 8 relates to time entry, the reporter may be a terminal and screen of a supervisor that is monitoring the time entries of each of the users of the three GUI screens 810, 820 and 830. Alternatively, the reporter may be a report generating routine stored within TKET server 102 (of FIG. 1, for example) and executed by a processor within TKET server 102.

While the example of FIG. 8 includes an illustration of how objects may be changed, it is to be understood that a user also may be allowed by a higher ability level user (e.g., a manager or an administrator) to change other features of the GUI screen including color, font type, etc. Moreover, as mentioned before with respect to FIG. 7, even the lowest ability level user has the capacity to rename objects. Thus, for a reporter 840 to be able to meaningfully monitor the time keeping and expense tracking of the user, a database or table is needed to map the changes made by the user from the default settings provided to him.

The database or table thus enables the reporter to analyze numbers and add values from different users having different names but representing the same basic parameter. For example, one user may track a term named "Hourly value" while another user tracks a term name "Client cost" wherein both numbers represent the amount that the client or project is to be charged for the contract employees time and effort. Thus, if the mapping of object names is found within database 216 of FIG. 2, for example, reporter 840 must communicate with database 216 to properly generate the time and expense tracking reports.

Figure 9:
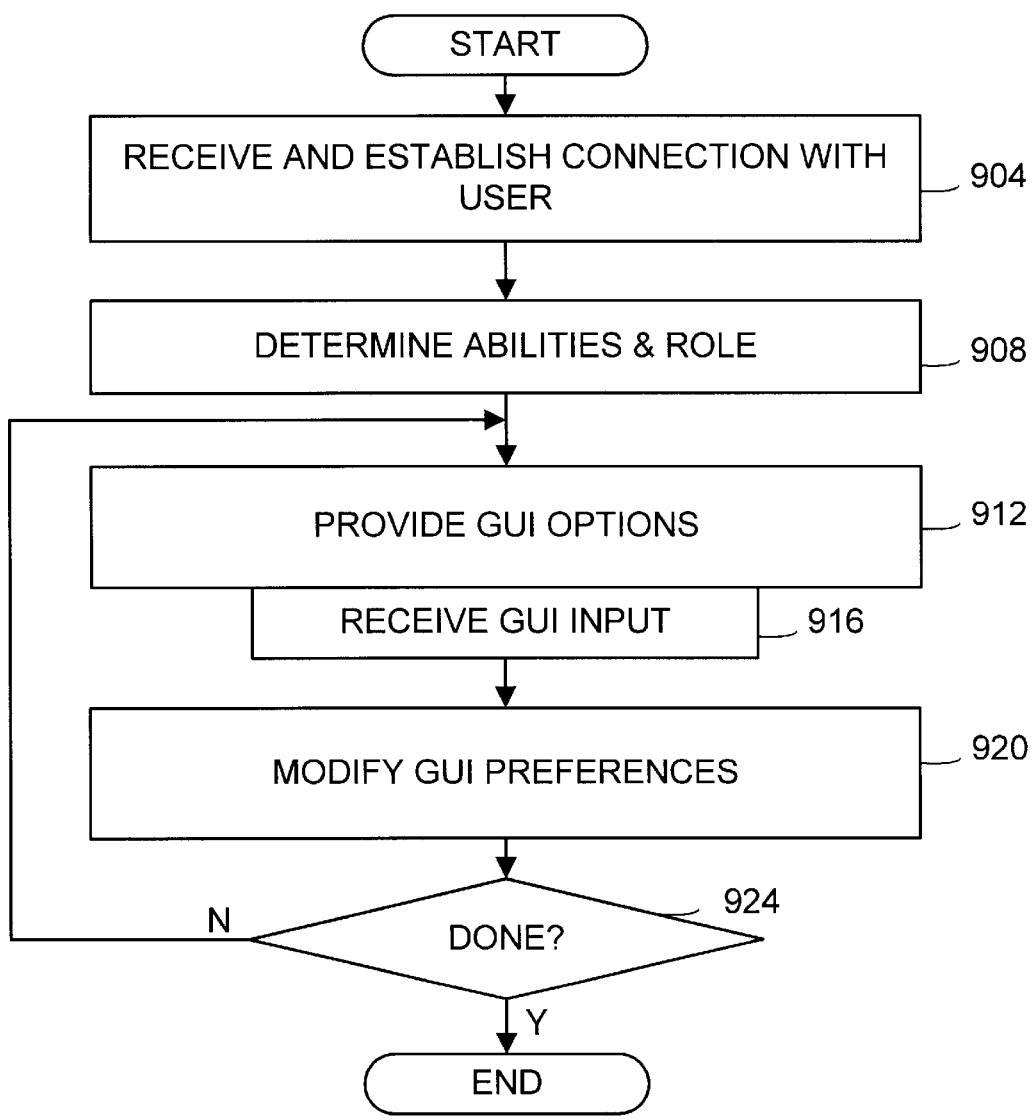
FIG. 9 is a flow chart that illustrates a method performed by a TKET server for setting GUI screen preferences for a user.

FIG. 9 is a flow chart that illustrates a method performed by a TKET server for setting GUI screen preferences for a user. First, the TKET server receives and establishes a connection with a user and determines the user ID (step 904). As was shown in FIG. 1, the connection may comprise a path through any one of the public switched telephone networks, through a wireless network, through a local area network, through any one of the various Internets or through any combination of these networks.

After the connections is established, the TKET server determines the user's role and associated abilities for defining and modifying objects of a GUI screen (step 908). For example, if the user role is that of an administrator, the TKET may allow the user to make any change from an original default screen that is desired (unless, of course, the TKET server operator chooses to make one or more objects fixed (e.g., a small logo inconspicuously displayed). Alternatively if the user is a lower ability level user relative to the administrator, then the TKET server must determine the objects that the user is allowed to modify or change.

Once the TKET server determines the user role and corresponding abilities, it provides the options to the user for making changes to the GUI screen page (step 912). As indicated before, these options are options for modifying GUI screen display parameters of a default page. In an alternate embodiment, however, a default page is not provided for the highest ability level user. For this embodiment, the highest level user (administrator) must define the layout of the GUI screen page. The default page of course is the page settings created by a user that is one ability level higher than the present user and includes the selections of all users that are at a higher ability level than the present user. In the case of the highest ability level user (e.g., an administrator), the GUI screen default page is created by the operator of the TKET server for the purpose of providing the administrator a starting point for creating and defining his GUI screen page.

Thereafter, the TKET server receives the user's GUI screen page definitions (step 916). The definitions can be in the form of fixed data values, text (e.g., formulas for making calculations that are to be displayed), and row and column names, row and column arrangements.

After each GUI screen definition is received, the invention includes accepting and modifying the GUI screen definitions from the default value(s) (step 920). This step includes storing the received GUI screen definitions with respect to the user ID. After each GUI screen definition is received, the invention includes determining whether the user is through making changes and defining his GUI screen or whether to present the GUI screen modification options to the user once again to receive more changes (step 924). For example, the TKET server may transmit a signal asking the user if he has more changes to make. Based upon the response, either step 912 is repeated or the inventive method of FIG. 9 is complete.

Each of the above steps for creating a GUI screen page may be performed multiple times to create multiple GUI screen pages. For example, a user realizing that he will want to access the GUI screen page from two different terminals, each having significantly different data handling capacity, may want to define a GUI screen page for each of the two terminals. Accordingly, when the user logs into the GUI screen server, he is able to select the desired GUI screen page.

Figure 10:
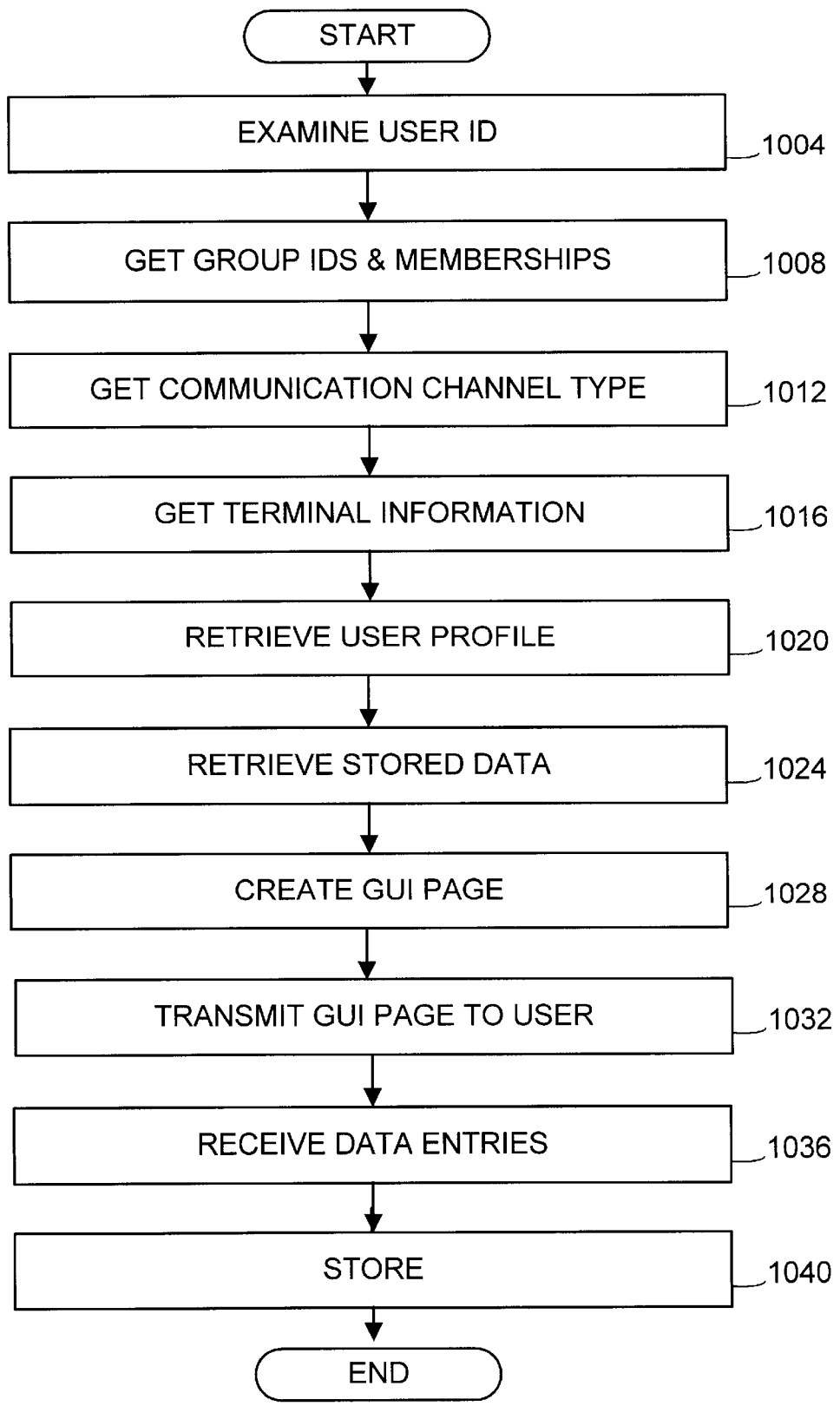
FIG. 10 is a flow chart illustrating a method for generating a GUI screen page to a user and for receiving data inputs from the user for storing and processing.

FIG. 10 is a flow chart illustrating a method for generating a GUI screen page to a user and for receiving data inputs from the user for storing and processing. Initially, when the user logs in, the TKET server examines the user ID so that it may determine the necessary information for generating a GUI screen page to the user (step 1004). Thereafter, the TKET server determines the group IDs and memberships that correspond to the user ID received from the user (step 1008).

As a part of determining how to set up a GUI screen page, the invention includes determining what type of communication channel is to be used to transmit the created GUI screen page (step 1012). For example, this step includes determining whether the GUI screen page is to be transmitted via wireless data link, through a low bandwidth serial line by way of a modem such as a typical 56 K byte/sec desktop computer modem, or through high speed serial digital communication link utilizing a T1 (Trunk Level 1) or T3 (Digital Signal Level 3) line. More generally, this step includes determining the data throughput capacity of the data link for slowest known data link between the user terminal and the TKET server.

Knowing the data throughput capacity by determining the type of communication channel is important for determining what features to include in the page for transmission to the user. One part of determining data throughput capacity of the data link is determining what the appropriate protocol for generating and transmitting the page should be. For example, hypertext markup language (HTML) is appropriate for a full GUI screen page being transmitted to a desktop terminal. Similarly, hand held device markup language (HDML) is appropriate for PDAs and other hand held devices while wireless application protocol (WAP) is appropriate of wireless devices or terminals.

Finally, in order to determine the characteristics of the GUI screen page that is to be created, the TKET determines the terminal type (step 1016). For example, if the terminal type is a PDA, its capacity for receiving GUI screen displays having color information will likely be notably lower than the capacity of a desktop computer. Similarly, if the PDA is to receive the GUI screen page over a wireless link, then the amount of information that may be transmitted must be reduced even further. Accordingly, a simpler GUI screen page should be created.

In addition to the above steps of analyzing the system parameters that affect how much information may be used to form a GUI screen page for transmission to the terminal, the inventive method includes determining what user profiles have been previously defined for the user. Thus, the invention includes obtaining the user profiles that, in the preferred embodiment, are stored in a database and may be accessed by the user ID (step 1020). Additionally, besides determining what the defined objects are for the user and how they should be arranged on a GUI screen page, the data content of the objects must be retrieved so that the GUI screen page may be populated with the user's data (step 1024).

At this point, the TKET server has determined the necessary information for building the GUI screen page. Thus, the next steps include building the GUI screen page (step 1028), transmitting it to the user (step 1032), receiving data entries from the user for some of the various objects of the GUI screen page (step 1036), and storing the data in a database (step 1040).

The above listed method steps for creating a GUI screen page according to network and user selected parameters may be practiced in one of several different manners. For example, in the described embodiment, the TKET server determines the type of GUI screen page that should be built for transmission to the user based upon transmission channel and terminal capacities. For this embodiment, the TKET server analyzes a user terminal ID to determine type of terminal. The user ID may be selected and entered by the user or it may be embedded in a set of setup signals transmitted by the terminal.

With respect to the transmission channel, TKET server analyzes the source of the incoming communication link. By way of example, if the communication link is received by the TKET server from a mobile switching center of a wireless network, then the TKET server determines that a wireless communication link is included in the communication path. In the described embodiment, the TKET server maintains a list of prefix numbers that identify the mobile switching centers. The list of numbers and their originating sources may be operated in a manner similar a telecommunication network service control point.

In an alternate embodiment of the invention, the first time a user establishes a link to a TKET server for a session, the server merely sends a signal to the terminal to prompt it to generate an immediate response in order to measure a response time. By measuring the response time, the TKET server is able to roughly determine data transport capacity through the established communication link for that session. Accordingly, it is at least partially from this approximation that the TKET server selects the size and complexity of the GUI screen page that it builds for transmission to the user terminal.

In yet another embodiment of the invention, the TKET server initially selects one of a plurality GUI screen formats according to terminal type. Thereafter, GUI screen elements are implied according to the communication channel performance. For example, if the select GUI screen that corresponds to terminal type includes color information, but the communication channel response time does not allow for color information to be transmitted without incurring a delay beyond a specified amount, the TKET server may create an implied GUI screen that does not include color information. Thus, as may be seen, the invention includes determining the complexity of the GUI screen that is to be built not only by operator selection, but also by system capabilities or performance.

The actual parameters that are to be selected or discarded for those embodiments in which a full set of GUI screen display signals is not to b e generated by the TKET server makes the determination may readily be modified according to implementation of the inventive methods herein. In general however, they include decisions about whether to transmit color information, whether to transmit graphical symbols, logos and designs or even font information, whether to transmit specified advertisements, and whether to transmit certain arrangement information.

Figure 11:
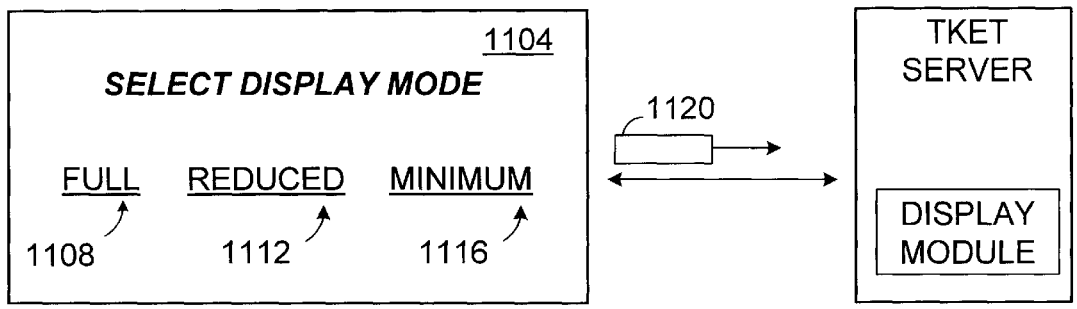
FIG. 11 is a functional block diagram illustrating a TKET server in communication with a user terminal according to an alternative embodiment of the invention.

FIG. 11 is a functional block diagram illustrating a TKET server in communication with a user terminal according to an alternate embodiment of the invention. Referring now to FIG. 11, it may be seen that a TKET server 1100 is in communication with a user terminal having a display screen 1104. As may be seen from viewing screen 1104, three URLs representing different display options from which the user may choose are being displayed. Each display option represents different display nodes.

First, option 1108 labeled "Full" is for enabling the user to select a full GUI screen display node. Option 1112 is for enabling the user to select a reduced GUI screen display while option 1116 is for allowing the user to select a minimum display. The user selection is then transmitted by the user terminal in a user selection signal 1120 that is transmitted to TKET server 1100. A display module 1124 within TKET server 1100 is operable to receive signal 1120 and to generate display signals to create a GUI screen display responsive thereto.

While the example of FIG. 11 illustrates the user being given URLs to select GUI screen display signal characteristics being transmitted by the TKET server, other approaches may be employed. More specifically, the URLs are used to cause the communication link to establish a communication link to an Internet address. The TKET server, utilizes generates GUI screen display signals having characteristics that correspond to the URL. Thus, for the example of FIG. 11, because three URL addresses are shown, the TKET server has at least three different sets of URL signal display characteristics to generate responsive thereto. In an alternate embodiment of the invention, however, a GUI screen display may prompt the user to select from a plurality of display characteristics. The user choice is then transmitted to the TKET server for it to generate GUI screen display signals having characteristics that are responsive thereto.

In one embodiment of the invention, each of the options presented to the user on screen 1104 is one that triggers a different URL, which causes signal 1120 to be transmitted to different destinations. In another embodiment of the invention, each of the choices is merely identified and reflected within signal 1120. Accordingly, display module 1124 extracts the selected choice from signal 1120 and generates the display signals to create a GUI screen that is responsive thereto.

Figure 12:
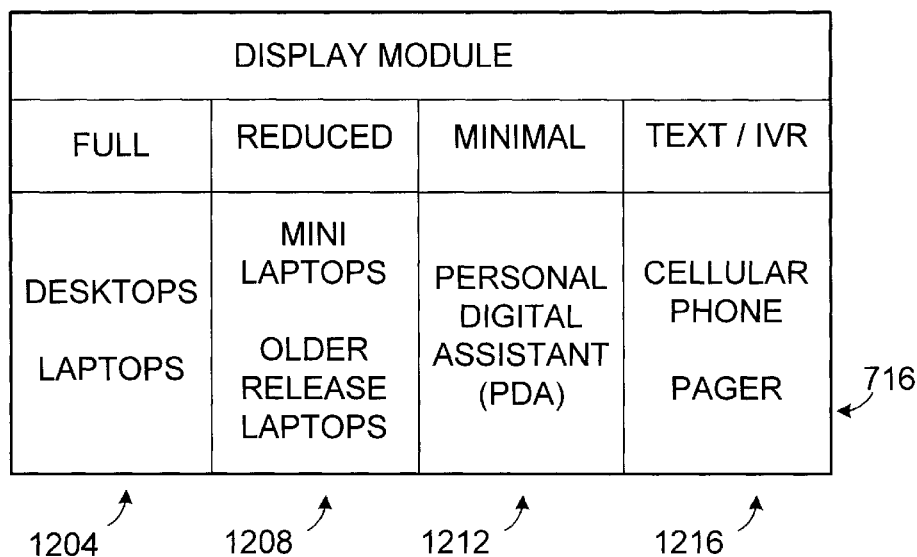
FIG. 12 is a table illustrating a method within a TKET server for generating a GUI screen display at a remote terminal according to a preferred embodiment of the invention.

FIG. 12 is a table illustrating a method within a TKET server for generating a GUI screen display at a remote terminal according to one embodiment of the invention. In the described embodiment, the display module of TKET server 102 analyzes the terminal type to select from one of at least four different display types. For example, as is shown in column 1204, desktop computers and laptop computers receive a set of display signals for generating a "FULL" GUI screen display. In other words, a fully defined GUI screen display is generated at the remote terminal responsive to a set of signals that cause such a display being received by the remote terminal and transmitted by the TKET server. Column 1208, however, illustrates a reduced set of display signals that might be transmitted to what is being referred to herein as a mini laptop. A mini laptop, as defined herein, is a device that, in terms of data storage and processing capacity, is somewhere between a PDA such as a Palm Pilot® and a laptop computer. Many companies are now starting to produce very powerful PDA's that contain or communication transceivers capable of supporting reasonably high data throughput rates but that do not provide the power and speed of a modern laptop.

Column 1212 illustrates that for certain types of terminals, such as a PDA, a minimal set of display signals are to be transmitted thereby resulting in the user terminal displaying a minimal GUI screen display. For example, if the user terminal is a wireless PDA, then a set of display signals that would generate a minimal GUI screen display are transmitted by the display module of the TKET server. Finally, if the terminal is merely a telephone having a very limited display capacity, as is shown in column 1216, the display signals may comprise little more than text and control signals for the text. Alternatively, if the user terminal is a telephonic device, the "display signals" may comprise nothing more than voice information generated by an IVR. Alternatively, the display signals for phones might be a combination of text and voice signals.

For each of these types of devices, there are multiple ways that the display module and/or other modules within the TKET server 102, of FIG. 1 for example, may determine the type of user terminal. The protocol being used by the terminal in establishing a communication link with the TKET server can be very revealing as to the type of terminal.

For example, if TKET server 102 of FIG. 1 analyzes a received signal to determine whether the remote user terminal is using an HTML, an HDML or a WAP protocol for communicating. If the terminal is using HTML, then it probably is a device having the capability of a desktop, a laptop or other similar computer. If the protocol is a WAP protocol, then the TKET server may determine that the communication path includes a wireless link. If the protocol is an HTML protocol, the TKET server may determine that the backup user terminal is a PDA.

FIG. 13 is a table illustrating a method for determining whether to generate a set of signals for displaying either a full, reduced or minimal GUI screen display based upon communication path characteristics according to one aspect of the present invention. Referring now to the exemplary system described FIG. 13, it is seen that one of at least three different display modes of full, reduced and minimal are illustrated in columns 1304, 1308 and 1312, respectively. It should be understand the invention includes having different numbers of display nodes. Additionally, rows 1316, 1320 and 1324 illustrate different communication path characteristics that influence the display mode or type of GUI screen display screen that is generated by the TKET server.

Examining row 1316, if the communication link is an integrated services digital network (ISDN), a T1, a new generation wireless (for example, 3G) communication link or if the communication link is transceived by a modem having a modem bit rate that equals or exceeds 56 K, then the TKET server generates a full GUI screen display. Alternatively, if the user terminal modem is slower than a 56K modem or a wireless communication link that is older than a 3G wireless communication link, then the TKET server generates a reduced GUI screen display. Alternatively, if the wireless communication link includes transmission from a satellite system, the known latencies associated with satellite transmissions as well as the expense for a satellite link prompts the TKET server to transmit a minimal set of display signals that will prompt the receiving user terminal to generate a minimal GUI screen display.

Referring now to row 1320, it may be seen that the number of gateways can also influence whether a full, reduced or minimal set of display signals are transmitted for the generation of the GUI screen display screen. In one embodiment of the present invention, if the display signals have a communication path that includes only a number of gateways that is less than a defined number "A", then a full GUI screen display is transmitted unless there is a different reason for reducing the magnitude of the GUI screen display screen. However, if the number of gateways is within a range, by way of example, between and including the numbers A and B, then a reduced set of signals are transmitted to create a reduced GUI screen display. Finally, if the number of gateways exceeds the number B, then a minimal set of display signals are transmitted to create a minimal GUI screen display. In one described embodiment, A is set equal to one and B is set equal to three.

Row 1324 illustrates that geography may also be used to determine whether to transmit a full, reduced or minimal set of display signals to create corresponding GUI screen display screens. For example, if the display signals are being transmitted through the various networks to a geographic location that is within the North American continent, then a full set of display signals are transmitted. If, on the other hand, the signals are being transmitted either to Central America, South America or Europe, then a reduced set of display signals are transmitted to create a reduced GUI screen display screen. Finally, for all other locations, by way of example, the Far East, the Middle East or Australia or New Zealand, then a minimal set of display signals to create a minimal GUI screen display screen are transmitted. In summary, therefore, the table of FIG. 13 illustrates that the type of communication networks, the number of gateways, and the geographic location of the receiver or user are all significant parameters in determining whether to transmit a full, reduced or minimal set of display signals to create the corresponding full, reduced or minimal GUI screen display screens in a preferred embodiment of the invention. It is understood, of course that these geographic restrictions are exemplary. Moreover, even if there are actual restrictions today, inappropriately in data transportation technology will lead to different geographic constraint parameters.

FIG. 14 is a table illustrating the relationships of a corporate structure with respect to atomic abilities. Referring now to FIG. 14, a company XYZ includes two divisions, mainly, division A and division B. Division A has three departments wherein the first department has two groups, the second department has three groups, and the third department has only one group. Within division B, there exist two departments, wherein department 1 has two groups and department 2 has only one group. The boxed relationship illustrates whose atomic abilities enable access to data. For example, a Dept. 1 and Dept. 1/GRP 1 Lead may modify the data in 1408. The types of individuals having atomic abilities that allow access to that data shown generally at 1404 include the employee, the group lead, the section manager, or the department director. However, at a higher level, such as that shown generally at 1408, only a group lead, section manager or department director may modify the data or object fields at the level shown generally at 1408. At the level shown generally 1412, only a director or manager might be assigned atomic abilities that enable objects within the GUI screen to be changed at that level. By way of example, department names and certain element of the GUI screen display may be modified and controllable at the department level. Finally, as shown at 1416, only Vice President level employees or employees having the authority granted by a Vice President, may modify the information or layout at the division level. The purpose of FIG. 14 is to illustrate that a given GUI screen may have different objects having different levels of accessibility with respect to the atomic abilities assigned to employees of the corporation.

FIG. 15 is a table illustrating, for exemplary purposes a way in which atomic abilities might be assigned to individuals. For example, for those individuals that are assigned an ID type that reflects a reporter ID type, the individual may be given access to review, but not modify all records within a specified area. Thus, for example, one reporter may only have access to review all information within the levels 1404 and 1408 for a given department. Employees that are given a manager ID type, would be granted atomic abilities that enables them to review all records within a defined area and to edit all records within a second defined area. The first and second defined areas may or may not completely overlap. For example, a given manager may have atomic abilities that enable him to review all data within departments one, two, and three of division A, but only edit the data fields within department one of division A. For this example, it is presumed that the manager is in fact the manager of department one and is therefore allowed access to view the information from the sister departments of the same divisions.

FIGS. 16A and 16B illustrate a method for providing access to timekeeping and expense tracking information according to one embodiment of the present invention. Referring now to FIG. 16A, a GUI screen shown generally at 1600 includes an image representing divided cards for a filing system with a plurality of tabs at the top. The tabs represent the level of access allowed by a user's assigned atomic abilities. By way of example, the left most tab represents the XYZ Company whose data is accessible by the user having atomic abilities for which access is authorized (e.g., the company president). FIG. 16B, in contrast, is given a screen that only displays tabs for a portion of the division. As may be seen, the types of information displayed for the "D Division Report" of FIG. 16B is different that FIG. 16A. Specifically, for the given categories, FIG. 16B illustrates data for groups within the division while FIG. 16A tracks the same data but for all of the divisions.

Figure 17:
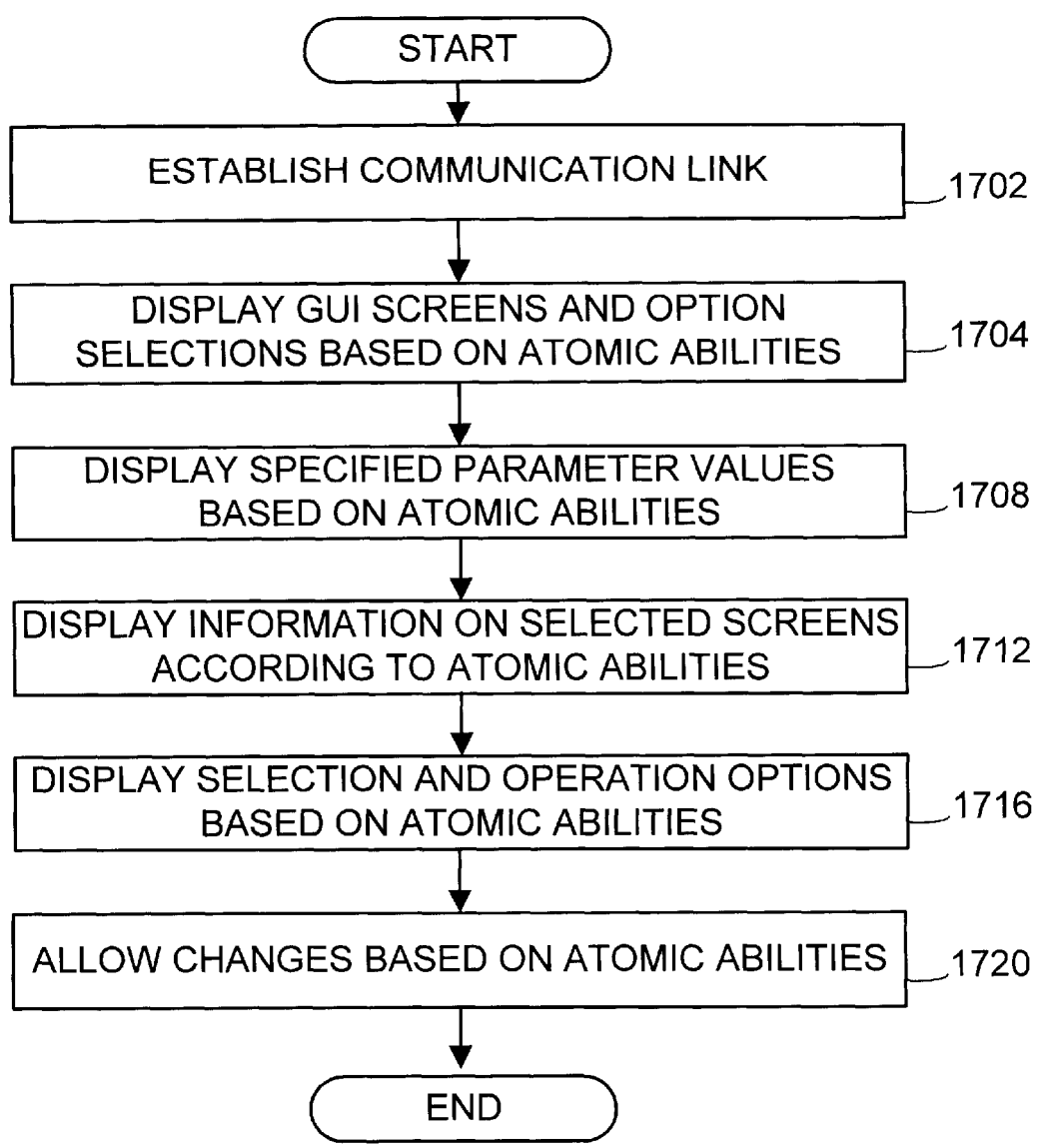
FIG. 17 is a flow chart illustrating a method for interfacing with a user based upon that user's atomic abilities.

FIG. 17 is a flow chart illustrating a method for interfacing with a user based upon that user's atomic abilities. Referring now to FIG. 17, a communication link is first established (step 1702). Responsive thereto, a time keeping and expense entry server generates and transmits GUI display signals to cause the user terminal to display specified GUI screens and selection options based upon the user's atomic abilities (step 1704). In general, the TKET server maintains a list of users and their access privileges (atomic abilities). Accordingly, step 1704 contemplates the server examining the list of users as a part of generating the GUI display signals that are transmitted to the user terminal.

Thereafter, the TKET server displays, according to atomic abilities, performance and other parameter values (step 1708), corporate and other information (step 1712), and options to select or choose specified operations (step 1716). Finally, if a user wishes to make changes to the information that is displayed, the server determines whether to allow the changes based upon the user's atomic abilities (step 1720).

Figure 18:
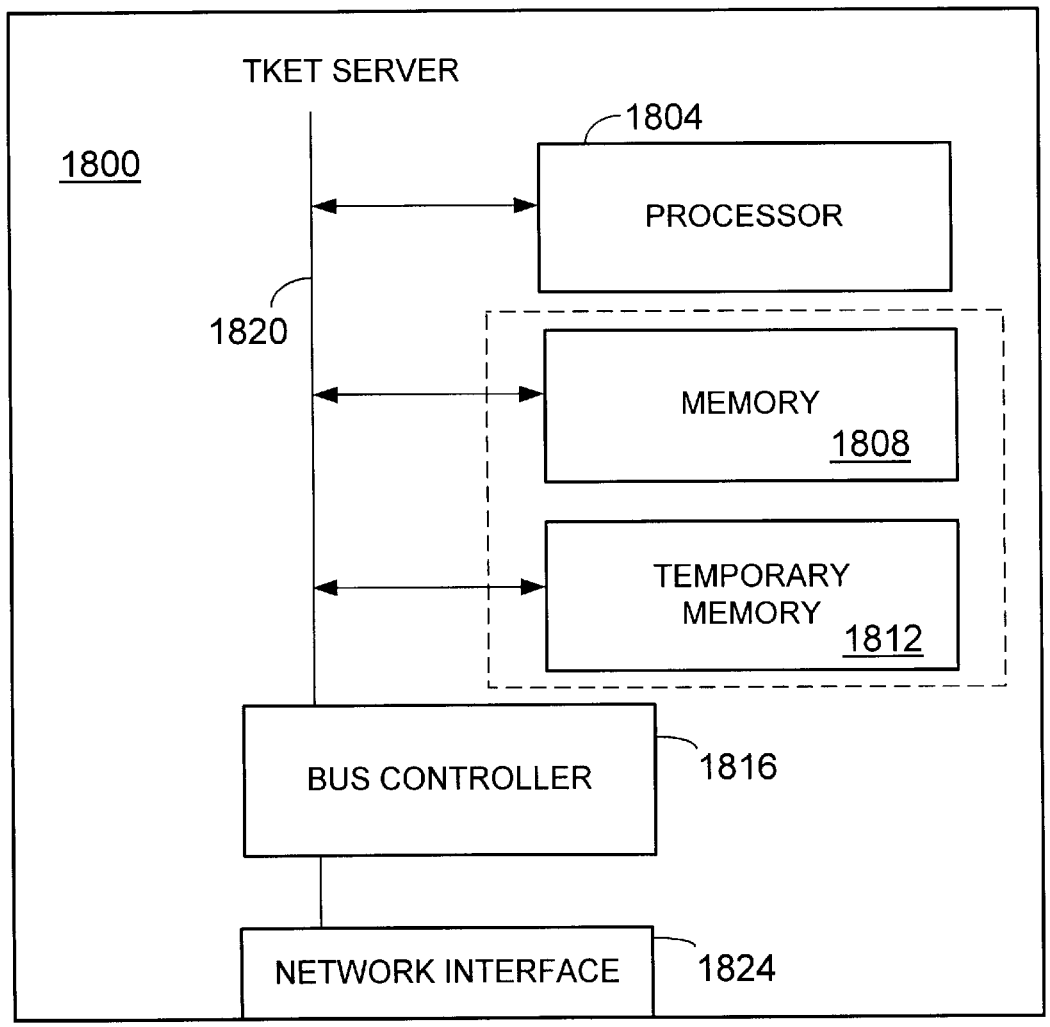
FIG. 18 is a functional block diagram illustrating the circuitry within a time keeping and expense entry server according to one embodiment of the present invention.

FIG. 18 is a functional block diagram illustrating the circuitry within a time keeping and expense entry server according to one embodiment of the present invention. As may be seen, a TKET server 1800 includes a processor 1804, a memory 1808, a temporary memory 1812, and a bus controller 1816, each of which is connected to a bus 1820. Memory 1708 is formed of a hard drive while temporary memory 1812 is formed of random access memory. In general, memory 1808 is for storing computer instructions that define the operational logic of the server 1800 as described herein this application with particular reference to the illustrated methods and processors. Thus, processor 1804 receives the computer instructions by way of bus 1820 and executes them. The processor, as needed, temporarily stores data, by way of bus 1820, within temporary memory 1812. The processor may be any known type of processor. While the permanent memory in the described embodiment is a hard drive, any type of memory capable of retaining information through power cycles may be used. As may also be seen, a network interface 1824 is connected to the controller 1816 to enable the server 1800 to communicate with other external devices.

The modules described in this application are formed logically by the processor's execution of the stored computer instructions. The server and/or modules may, in alternate embodiments, be implemented by application specific integrated circuits or other known circuit design approaches made to implement a specified logic design.

The invention disclosed herein is susceptible to various modifications and alternative forms. Specific embodiments therefor have been shown by way of example in the drawings and detailed description. It should be understood, however, that the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method in a server for generating a GUI screen, comprising the steps of:

maintaining an access list of users and an access level of each user in the list of users;

maintaining a mapping between modifiable fields and users of the list of users according to access level;

maintaining a mapping of modified field names and default field names examining a user ID for a first user to determine user group affiliations and capacities based on assigned access level;

receiving from the first user an indication of a modified atomic ability for a second user wherein the second user is a lower level user than the first user;

storing the modified atomic ability for the second user;

receiving a user ID for the second user indicating the second user is logged in; examining the second user's atomic abilities;

examining a user terminal capacity for the second user; and building and transmitting a GUI page having a plurality of tabs at a side of the GUI page wherein the tabs that are displayed are based upon the atomic abilities of the user and wherein the tabs displayed for the second user are a subset of the tabs displayed for the first user.

2. The method of claim 1 further including the step of prompting the user to select from a plurality of defined GUI pages.

3. The method of claim 1 further including the step of implying the arrangement of a GUI page based upon a defined GUI page.

4. The method of claim 3 including the step of implying the arrangement of a GUI page based upon user terminal capabilities.

5. The method of claim 3 including the step of implying the arrangement of a GUI page based upon network characteristics.

6. The method of claim 2 further including determine what objects are to be displayed for second user based upon his access level and his atomic abilities.

7. The method of claim 6 further including determine what objects are to be displayed in a manner indicating they may be modified by the second based upon his access level and his atomic abilities.

8. A method for displaying a GUI screen, comprising:

receiving GUI screen layout information from a first user having a first access level with a corresponding set of atomic abilities;

receiving an indication that a plurality of lower level users have logged in and determining, for each of the plurality of lower level users:

the lower level user's access level;

the lower level user's atomic abilities;

what objects may be displayed to the lower level user;

of the objects that may be displayed, which objects may be displayed in a modifiable format;

of the objects that may be displayed, which objects may be displayed in a non-modifiable format; and generating a corresponding GUI screen to the user having a plurality of tabs for display on one side of the GUI screen wherein the tabs that are displayed are based upon the atomic abilities of the user and wherein the tabs displayed for the second user are a subset of the tabs displayed for the first user.

9. The method of claim 8 further including, for at least one user, receiving an indication of modified atomic abilities for a lower level user.

10. The method of claim 8 further including a first user modifying the atomic abilities of a second (lower level) user.

11. The method of claim 8 further including the second user modifying the atomic abilities of a third (lower level) user.

12. The method of claim 8 wherein the method is performed by a time keeping and expense server for maintaining and receiving time and expense entries for a plurality of users.

13. The method of claim 12 wherein the time keeping and expense server generates GUI screens not only based upon a user's atomic abilities, but also based a user's terminal capacity.

14. The method of claim 12 wherein the time keeping and expense server generates GUI screens not only based upon a user's atomic abilities, but also based a throughput capacity of a communication link between the time keeping and expense server and the user terminal.

15. The method of claim 12 wherein the time keeping and expense server generates GUI screens not only based upon a user's atomic abilities, but also based a user's terminal graphics ability.

* * * * *